United States Patent
Gosiewski et al.

(10) Patent No.: US 6,462,126 B1
(45) Date of Patent: Oct. 8, 2002

(54) STRUCTURAL ADHESIVE

(75) Inventors: Donald Gosiewski, Peabody, MA (US); William E. Loven, Groveland, MA (US); Daniel L. Leeser, Framingham, MA (US); Kenneth A. Lambert, Billerica, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/568,079

(22) Filed: May 10, 2000

(51) Int. Cl.$^7$ ............................................. C08L 33/06
(52) U.S. Cl. ....................................... 524/560; 525/261
(58) Field of Search ......................................... 524/560

(56) References Cited

U.S. PATENT DOCUMENTS

| | | |
|---|---|---|
| 3,644,258 | * 2/1972 | Moore ........................ 260/29.6 |
| 3,911,100 | * 10/1975 | Sim ............................. 424/22 |
| 3,925,895 | 12/1975 | Kliment et al. |
| 3,944,632 | 3/1976 | Yu et al. |
| 3,984,497 | 10/1976 | Owens et al. |
| 3,985,703 | 10/1976 | Ferry et al. |
| 4,034,013 | 7/1977 | Lane |
| 4,041,103 | 8/1977 | Davison et al. |
| 4,096,202 | 6/1978 | Farnham et al. |
| 4,242,470 | 12/1980 | Gergen et al. |
| 4,304,709 | 12/1981 | Salee |
| 4,306,040 | 12/1981 | Baer |
| B1 4,096,202 | 8/1983 | Farnham et al. |
| 4,495,324 | 1/1985 | Chacko et al. |
| 4,536,546 | 8/1985 | Briggs |
| 4,714,730 | 12/1987 | Briggs et al. |
| 4,942,201 | 7/1990 | Briggs et al. |
| 4,959,405 | 9/1990 | Briggs et al. |
| 5,112,691 | 5/1992 | Briggs et al. |
| 5,169,902 | 12/1992 | Yagi et al. |
| 5,283,153 | * 2/1994 | Sacripante .................. 430/138 |
| 5,283,265 | * 2/1994 | Kimura ........................ 522/18 |
| 5,288,585 | * 2/1994 | Mahabadi .................... 430/137 |
| 5,380,772 | 1/1995 | Hasegawa et al. |
| 5,470,687 | * 11/1995 | Mayama ..................... 430/137 |
| 5,484,681 | * 1/1996 | Cunningham ............... 431/137 |
| 5,660,965 | * 8/1997 | Mychajowskij ............. 430/137 |
| 5,989,629 | * 11/1999 | Sacripante .................. 427/180 |
| 6,187,221 | * 2/2001 | Gore ........................ 252/187.1 |
| 6,268,464 | 7/2001 | Keinanen et al. |

OTHER PUBLICATIONS

Charles A. Harper, Handbook Of Plastics and Elastomers, "Fundamentals of Plastics and Elastomers", pp. 1–106 through 1–119.

George Odian, Principles of Polymerization, Third Edition, pp. 262 through 266.

* cited by examiner

*Primary Examiner*—Paul R. Michl
(74) *Attorney, Agent, or Firm*—Pitney, Hardin, Kipp & Szuch LLP

(57) ABSTRACT

An adhesive comprising a combination of high molecular weight acrylic and/or methacrylic esters, which become co-polymerized with low molecular weight acrylic and/or methacrylic esters, and advantageously polymers, such as impact modifiers including graft co-polymer (core-shell and non core-shell) impact modifiers, carboxylic acids, elastomers, and sulfur bearing compositions, such as chlorosulfonated polymers.

33 Claims, No Drawings

STRUCTURAL ADHESIVE

BACKGROUND OF THE INVENTION

The invention relates generally to structural acrylic/methacrylic adhesives and more particularly to acrylic/methacrylic adhesives used for construction purposes or the assembly of large objects.

Many products, ranging from car parts to boats to truck cabs and other structures are made by bonding various sheets (panels) of material, such as fiberglass, with adhesives. For example, U.S. Pat. Nos. 4,942,201 and 4,714,730, assigned to ITW of Glenview, Ill., the contents of which are incorporated herein by reference, describe adhesives made with methacrylate and acrylate based adhesives together with various other additives and ingredients for use in the construction of large objects.

Available adhesives have exhibited certain inadequacies in their potential application to various construction and manufacturing methods. For example, it is often desirable to apply the adhesive to a first surface of a panel and permit the adhesive to remain "open" and uncured for working times longer than one hour or more before the panel is adhered to another structure. For example, during the construction of large boats, the panel to be adhered could be 30 feet or longer and the bead, typically applied in a serpentine fashion would be even longer. It is therefore necessary for the beginning of the bead to remain workable and uncured until it is time to adhere the panel. This period of time, between the time when the adhesive is applied to a first substrate and when that first substrate is pressed to a second substrate to bond the first substrate to the second substrate will be referred to herein as "open time".

It is also desirable for adhesives to exhibit excellent cure properties, even when applied to cross sections well above $1/16$ of an inch. For example, when large panels are fastened to structures with adhesive, the gap between the two members can vary in thickness.

Gaps in a pair of adhered 20–50 foot panels can be 1 inch or more. Adhesives that are applied to this thickness generate considerable heat while curing. Methyl methacrylate boils at 210° F. It is undesirable for the adhesive to boil during curing, because bubbles can form thereby reducing structural integrity of the bonded assembly.

It is also desirable for adhesives to cure over a wide range of temperatures, including cold temperatures below 65° F. and hot temperatures that one might experience when building boats in southern Florida. Thus, it is desirable for adhesive to cure at cold temperatures, yet remain open for sufficiently long times at hot temperatures.

Available adhesives have exhibited other inadequacies. For example, many state of the art adhesives can "swim" on materials when a first panel is bonded to a second panel in an overhead or vertical arrangement. Parts are often bonded before fiber reinforced polymer materials have fully cured. The adhesive can solvate the bonding surface to the extent that a boundary layer of liquid methacrylate and e.g. polyester is formed between the bulk of the adhesive bead and the surface being bonded. The adhesive bead can then "swim" down the vertical surface or in the case of overhanging overhead surfaces, fall off. This swimming phenomenon has interfered with the use of methacrylate and acrylate adhesives for structural bonding of large members in vertical or overhanging positions. Thus, in many instances, it has become necessary to hold the members being bonded until the adhesive has cured. This can interfere with construction times and can in certain instances, make the use of adhesives undesirable or impossible without complicating the manufacturing process or employing additional fastening mechanisms.

Accordingly, it is desirable to provide a new adhesive and method of forming the adhesive which overcome drawbacks of the prior art.

SUMMARY OF THE INVENTION

Generally speaking, in accordance with the invention, an adhesive comprising a combination of high molecular weight acrylic and/or methacrylic esters, which become co-polymerized with low molecular weight acrylic and/or methacrylic esters, and advantageously polymers, such as impact modifiers including graft co-polymer (core-shell and non core-shell) impact modifiers, carboxylic acids, elastomers, and sulfur bearing compositions, such as chloro sulfonated polymers and other active sulfur moieties is provided.

Accordingly, it is an object of the invention to provide an improved adhesive.

Another object of the invention is to provide an improved method of making adhesives.

Still another object of the invention is to provide improved structures bonded together with adhesives.

Still other objects and advantages of the invention will in part be obvious and will in part be apparent from the specification and the drawings. The invention accordingly comprises a composition of matter possessing the characteristics, properties, and the relations of components which will be exemplified in the compositions hereinafter described, and the scope of the invention will be indicated in the claims. The invention also comprises the several steps and the relation of one or more of such steps with respect to each of the others, and the constructions, compositions and articles embodying the features of construction, combinations and arrangements of parts which are adapted to effect such steps, and the articles, constructions and compositions which possess the characteristics, properties and relations of elements, all as exemplified in the detailed disclosure hereinafter set forth.

DETAILED DESCRIPTION OF THE PREFERRED EMBODIMENTS

This invention is directed to structural adhesive compositions.

The adhesive compositions of this invention can be made by combining:

(A) a methacrylate or acrylate ester monomer;
(B) an elastometric polymer soluble in the ester monomer;
(C) a graft copolymer;
(D) a free radical producing catalyst;
(E) an organic acid; and
(F) a sulfur bearing compound.

Adhesive compositions of this invention will advantageously contain about 40 to about 70 weight percent methacrylate ester monomer, 0 to about 15 weight percent acid monomer, about 5 to about 20 weight percent elastomer and about 10 to about 30 weight percent graft copolymer, said weight percents being based on the total weight of the components. Preferably, the compositions contains about 50 to about 60 weight percent methacrylate ester monomer, about 0.1 to about 5 weight percent acid monomer, about 8 to about 15 weight percent elastomer and about 15 to about 25 weight percent graft copolymer.

The monomers useful in this invention include a combination of high molecular weight (MW) and low molecular weight methacrylate and acrylate ester monomers which are copolymerized during the curing process. The low molecular weight monomers are characterized by the alcohol portion of the ester group having 1 to 8 carbon atoms. The high molecular weight monomers are characterized by the alcohol portion of the ester group having 9 to 40 carbon atoms.

Examples of such low molecular weight ester monomers are methyl methacrylate, ethyl methacrylate, butyl methacrylate, 2-ethyhexyl methacrylate, cyclohexyl methacrylate and mixtures thereof. The preferred low MW ester monomer is methyl methacrylate.

Additional low molecular weight ester monomers which can be used alone or in combination with the methacrylate monomers are acrylate esters, examples of which are methyl acrylate, ethyl acrylate, butyl acrylate and 2-ethyhexyl acrylate. Other useful monomers are acrylonitrile, methacrylonitrile, styrene, vinyl toluene, and the like.

The low molecular weight monomer is advantageously included as about 50 to 60% of the adhesive composition.

Examples of such high molecular weight monomers are steryl methacrylate, lauryl methacrylate, polyethylene glycol methacrylates, and isodeceyl methacrylate.

The preferred high MW monomers are lauryl methacrylate and methoxy polyethylene glycol mono methacrylate. High molecular weight acrylates, particularly those with ether linkages, in effective amounts, appear useful in controlling boiling during curing.

The high molecular weigh monomer is advantageously included as about 2 to 15% of the adhesive composition.

The ratio of low MW monomer to high MW monomer is preferably from about 100:1 to about 100:40, more preferably 100:4 to about 100:30. The preferred ratio of methyl methacrylate : lauryl methacrylate is from about 100:0.1 to about 100:40, more preferably 100:1 to about 100:30. The preferred ratio of methyl methacrylate : methoxy polyethylene glycol is from about 100:0.1 to about 100:15, more preferably 100:1 to about 100:10.

Additional monomers which can be used in combination with the above ester monomers are free radical polymerizable ethylenically unsaturated mono or polycarboxylic acids. Acrylic acid, methacrylic acid, crotonic acid, maleic acid and fumaric acid are examples of such acids. The preferred acid is maleic acid.

It can also be advantageous to include elastomers, polymers and impact modifiers in adhesive compositions in accordance with preferred embodiments of the invention. For example, adhesives in accordance with preferred embodiments of the invention are advantageously used in the construction of boats, wherein two large sheets of composite material are bonded together. As the boat travels through the water, it can be subjected to "pounding" by the waves and the bonded sheets can flex differently. Thus, for this and other applications of adhesives in accordance with the invention, it can be advantageous that the cured adhesive have sufficient flexibility, or elasticity, which can be characterized as percent elongation, to permit some relative movement between the bonded surfaces. Thus, elastomers, polymers, impact modifiers and the like can impart advantageous elongation properties to the cured adhesive. Adhesives in accordance with embodiments of the invention can exhibit 50% and higher elongation after cure. Other embodiments of the invention require greater rigidity and may not benefit from the inclusion of these components.

Elastomers useful in this invention can advantageously have a second order glass transition temperature (Tg) of less than −25° and are advantageously soluble in the monomers described above. Useful elastomers include synthetic high polymers which exhibit plastic flow. The preferred elastomers are those which are supplied commercially as adhesive or cement grades.

A preferred class of elastomers for use in certain applications of this invention are polychloroprene (neoprene) and copolymers of butadiene or isoprene with styrene, acrylonitrile, acrylate esters, methacrylate esters, and the like. Additional useful elastomers are copolymers of ethylene and acrylate esters, homopolymers of epichlorohydrin and copolymers of epichlorohydrin and ethylene. The elastomer component, preferably neoprene, is advantageously included as about 5–30%, more preferably 5–15% of the adhesive composition.

Specific examples of useful polymers, using their letter designation according to ASTM D1418, their trade or common name and chemical description are: CR-Neoprene-polychloroprene; NBR-Nitrile rubber-butadiene acrylonitrile copolymer containing about 25 to about 45 weight percent acrylonitrile; COX-Hycar 1072-butadiene-acrylonitrile copolymer modified with carboxylic groups; SBR-GR-S-styrene-butadiene copolymer containing about 10 to about 30 weight percent styrene; ABR-Acrylic rubber acrylate butadiene copolymer; and CO, ECO-Hydrin 100 and 200-homopolymer or a copolymer of epichlorohydrin and ethylene oxide. Additional useful elastomers are copolymers of ethylene and acrylate esters, such as methyl acrylate and ethyl acrylate, wherein the copolymer preferably contains at least 30 weight percent acrylate ester, which elastomers are sold commercially by Dupont under the Vamac trademark.

Elastomers useful in this invention are described in detail in the "Handbook of Plastics and Elastomers" pages 1–106–119, (1975) McGraw-Hill, Inc., which is hereby incorporated by reference.

Particularly useful elastomers for certain embodiments of the invention are polychloroprene and block copolymers of styrene and butadiene or isoprene, such block copolymers being sold under the trademark Kraton by Shell Oil Company. Block copolymers of styrene and diene monomers are described in detail in U.S. Pat. Nos. 4,041,103 and 4,242,470 which are hereby incorporated by reference.

The elastomer component advantageously forms solutions of from about 10 to about 35 weight percent elastomer in the monomer component of the composition. As used herein the term "solution" is intended to cover not only true solutions but colloidal dispersions which exhibit normal or substantially newtonian rheology characteristics.

Graft copolymers useful in accordance with preferred embodiments of the invention are disclosed in U.S. Pat. No. 4,536,546, the contents of which are incorporated herein by reference. Polymers comprising chains of at least two different monomers can be linked together in a "block" or "graft" arrangement. Blocks are formed from alternating monomeric units. In a graft arrangement one or more chains or sequences are "grafted" onto a "backbone" of another chain. When the backbone is a rubber or rubber-like material, and the grafted sequences are vinyl, acrylate or methacrylate based monomers, the backbones are commonly referred to as the "core" and the grafted sequences as the "shell" surrounding the core. Advantageous graft copolymers can provide the adhesive composition with enhanced physical properties. Preferred graft copolymers have a backbone polymer with a glass transition temperature substantially below ambient temperature and a grafted polymer resin having a glass transition temperature substantially above ambient temperature, with ambient temperature considered the temperature range within which the adhesive is to be used.

Core-shell graft copolymers useful in this invention preferably have a "rubbery" core, a "hard" shell, and swell in the monomer compositions but do not dissolve therein. The "core" or backbone polymer of the graft copolymers preferably has a glass transition temperature substantially below ambient temperatures. The "shell" polymer which is grafted onto the backbone polymer preferably has a glass transition temperature substantially above ambient temperatures. Ambient temperature is defined as the temperature range in which the adhesive is used. While certain adhesives in accordance with the invention will not be subjected to temperatures below 32° F., others will.

Examples of useful core-shell graft copolymers are those where "hard" monomers, such as styrene, acrylonitrile or methyl methacrylate, are grafted onto a rubbery core made from polymers of "soft" or "elastomeric" monomers, such as butadiene or ethyl acrylate.

U.S. Pat. No. 3,985,703, which is hereby incorporated by reference, describes useful core-shell polymers, the cores of which are made preferably from butyl acrylate, but which can be based on ethyl, isobutyl, 2-ethylhexyl, or other alkyl acrylates or mixtures thereof The core polymer, optionally, should contain no more than about 20 percent of other copolymerizable monomers, such as styrene, vinyl acetate, methyl methacrylate, butadiene, isoprene and the like. The core polymer optionally, should contain no more than about 5 percent of a crosslinking monomer having two or more nonconjugated double bonds of approximately equal reactivity, such as ethylene glycol diacrylate, butylene glycol dimethacrylate and the like. It also optionally should contain no more than about 5 percent of a graft-linking monomer having two or more nonconjugated double bonds of unequal reactivity, such as diallyl maleate and allyl methacrylate.

The shell stage is preferably polymerized from methyl methacrylate and optionally other lower alkyl methacrylates, such as ethyl, butyl, or mixtures thereof. No more than about 40 percent by weight of the shell monomers should be styrene, vinyl acetate, vinyl chloride, and the like.

Additionally useful core-shell graft copolymers are described in U.S. Pat. Nos. 3,984,497, 4,096,202, and 4,034,013, which are hereby incorporated by reference.

Still other useful core shell polymers are the "MBS" polymers such as those described in U.S. Pat. No. 4,304,709 which is hereby incorporated by reference. The MBS polymers are made by polymerizing methyl methacrylate in the presence of polybutadiene or a polybutadiene copolymer rubber.

Other patents which describe various useful core-shell graft copolymers are U.S. Pat. Nos. 3,944,631, 4,306,040 and 4,495,324, each of which is hereby incorporated by reference.

The preferred core-shell graft polymers used in this invention swell in size in the adhesive formulation but do not dissolve. The adhesives, so formulated, exhibit improved flexibility, spreading and flow properties which are highly desirable in many adhesive applications.

Additional components of the composition of this invention include polymerization catalysts with or without other components which enhance the reactivity of the catalysts. Preferred catalysts include free radical generators which trigger the polymerization of acrylate and methacrylate compounds. Such catalysts are peroxides, hydroperoxides, peresters, peracids, radiant energy, e.g., ultraviolet light, and heat. Examples of these catalysts are benzoyl peroxide, cumene hydroperoxide, tertiary butyl hydroperoxide, dicumyl peroxide, tertiary butyl peroxide acetate, tertiary butyl perbenzoate, ditertiary butyl azodiisobutyronitrile and the like. These free radical producing catalysts are advantageously used in amounts of about 0.01 to about weight percent based on the weight of the adhesive composition. Preferably, the catalysts will be used in the amount of about 0.05 to about 3 weight percent. Preferred catalysts include cumene hydroperoxide and tertiary butyl hydroperoxide. Other components which enhance the reactivity of the catalysts are initiators or activators and promoters. Initiators and activators, which terms are used interchangeably, include tertiary amines and aldehyde-amine reaction products. Useful tertiary amines include N,N-dimethylaniline, N,N-dimethyltoluidine, N,N-diethylaniline, N,N-diethyltoluidine and the like. Aldehyde-amine reaction products include such compositions as butyraldehyde-aniline and butyraldehyde-butylamine compositions.

Promoter can be organic salts of a transition metal, such as cobalt, nickel, manganese or iron naphthenate, copper octoate, copper acetylacetonate, iron hexoate, or iron propionate.

The initiators or activators, if used, are preferably added in the amount of up to about 15 weight percent based on the weight of the adhesive. Preferred amounts are 0.01 to about 5 percent. Promoters are used in amounts up to about 0.5 weight percent, preferably about 1 part per million to about 0.1 weight percent.

It has been determined that by adding one or more carboxylic acids, particularly strong organic carboxylic acids, to acrylate and/or methacrylate based adhesive compositions in accordance with the invention, the bonding characteristics thereof change dramatically. It is believed that the addition of a strong organic acid acts to promote adhesion to solvent-resistant and/or heat-resistant plastics, thermoplastics, resin/glass composites, resins and the like, due to interactions at the molecular level, e.g., through hydrogen bonding, and the like.

As used herein, the terms "solvent-resistant," "chemical-resistant," "environmental-resistant," and "heat-resistant" are used when referring to plastics, thermoplastics, resins and composites to describe those materials which can be "difficult" to bond with many standard acrylate or methacrylate based adhesive compositions. It is believed that this difficulty may be due to the inability of the acrylate and/or methacrylate monomers to solvate such plastics. Such materials generally have a polymeric structure or a like chemical make-up which makes them inherently resistant to the effect of solvents, heat, and other environmental agents. These materials also commonly include within their structure, hydrogen bonding acceptor sites which are formed by electron rich atoms (e.g., N, O, or the like) or by similar electronegative groups. The main classes of these materials are the thermoplastics and thermosets.

Solvent-resistant thermoplastic materials whose bondability is most dramatically enhanced by the compositions of the present invention are generally polar and/or crystalline polymers or blends of such polymers and include nylon and blends of nylon and nylon-like materials with other polymers, such as polyimides and blends of polyimide with other polymers such as polyester.

Solvent-resistant thermoset materials which exhibit dramatically enhanced bondability with the adhesive compositions of the present invention generally comprise polar, solvent-resistant, materials, and include homogeneous materials such as epoxies and urethanes, and composite materials such as polyesters, urethanes, and/or epoxies, containing fillers such as glass, minerals, carbon, and the like. In the case of composite thermoset materials, either the base material (epoxy, urethane, polyester, etc.) or the filler (or both) may have the requisite hydrogen bonding capability, or other requisite adhesion promoting characteristics.

Preferred embodiments of the invention thus utilizes an effective amount of one or more organic acids, preferably strong organic acids, i.e., acids having a relatively high dissociation constant ($K_d$). Such acids are identified in U.S. Pat. No. 4,714,730 and include fumaric, acetylene dicarboxylic, dibromo maleic citranoic, mesaconic; oxalic, and malonic. It has further been discovered that the addition of water to compositions containing these acids can increase their effectiveness, apparently through partial or enhanced solubility, which is believed to aid in the dissociation thereof. These adhesive effects can further be enhanced by heat treatment of the bonds either during or after the bonding step (or both). The preferred acid is maleic acid, which is advantageously included in about 0.5 to 4% of the adhesive composition.

The amount of the strong organic acid to be added to the adhesive base composition varies with both the acid and the adhesive. Most of the strong organic acids used in the adhesive compositions of the present invention are water soluble, and thus many are insoluble in typical acrylate and/or methacrylate based adhesive formulations.

Typically the acid or mixture of acids is added to the adhesive formulation as a dispersion in an amount ranging from about 0.1 parts to 20 parts per hundred (pph), preferably from about 0.5 to 4 pph (based upon the weight of the formulation). Optionally, the acid can be dissolved in a sufficient amount of water and the mixture added to the adhesive. Those acids which are directly soluble in the adhesive base formulation may be added without prior solubilization.

As used herein, the term "strong organic acid" refers to an acid which is generally an organic carboxylic acid, e.g., R—COOH, (wherein R may be alkyl, aryl, aralkyl, and the like) so long as the relative "acid strength" of the organic acid is high. Di-and poly-basic acids as well as mixed acids are included.

To determine relative acid strength, one of two standards is employed herein:

The first standard makes use of the literature value for the dissociation constant ($K_d$) of the acid (at about 230° C., i.e., room temperature). To be useful herein, the $K_d$ value is generally within the range of from about $1\times10^{-4}$ to about $1\times10^{-1}$, preferably from about $1\times10^{-2}$ to about $1\times10^{-1}$. In the case of di- or poly-carboxylic acids, the Kd value used as a measure of the relative acid strength is the dissociation constant for the first acidic proton, i.e., $K_{1d}$.

The second standard for determining relative acid strength is generally applied to acids having no readily ascertainable Kd value. Under this standard, the pH of an 0.2N aqueous solution of the acid is measured. Such solutions of the strong acids useful in the present invention generally have pH values within the range of from about 1.2 to 2.3, preferably from about 1.3 to 2.0.

Adhesive compositions in accordance with preferred embodiments of this invention are typically prepared as two or more component adhesive systems. One of the components (parts) generally contains the free radical catalysts and is commonly referred to as the "activator". The other part generally contains the monomers and the initiator or activator and the promoter if it is used and is commonly referred to as the adhesive component or part. Just prior to use, the two parts are mixed together and the mixture is applied to at least one of the surfaces to be bonded. Alternatively, the part containing the catalyst can be applied to one surface and the part containing the activator can be applied to the other surface. When pressed together, the two parts mix together and polymerization with resultant adhesive bonding takes place.

In a preferred embodiment of the invention, the (weight or volume) ratio of adhesive to activator is from about 20 to 1 to 1 to 20, more preferably about 0.8:1.2 to 1.2:0.8 .

The adhesive compositions of this invention have high adhesive bond impact strength (>15 ft-lb/sq.in) and high bulk tensile elongation (>10 percent).

Substrates which can be bonded with adhesives in accordance with the invention, include those disclosed in U.S. Pat. No. 4,714,730 and include thermoplastics, thermosets, resins, composit resins, including polyester/glass, urethane/glass, epoxy/glass, epoxy graphite and epoxy kevlar surfaces along with steel, other metal, primed and.unprimed surfaces.

In preferred embodiments of the present invention, the adhesive base formulation comprises an effective amount of a solution of a sulfur-bearing composition. Examples include chlorosulfonated polyethylene, sulfonyl chloride and mixtures of sulfonyl chloride with chlorinated polyethylene, preferably in a polymerizable vinyl monomer or a mixture of monomers and a polymerization catalyst for improving the properties thereof.

Such an effective amount of the sulfur-bearing composition generally should contain from about 25 to 70 weight percent chlorine and from about 3 to 160 mmoles of sulfonyl chloride moiety per 100 grams of polymer and the polyethylene from which the chlorosulfonated or chlorinated polyethylene is prepared should have a melt index of from about 4 to 500. The solution can have a Brookfield viscosity of up to about 1 million. Materials such as these are described in Briggs et al., U.S. Pat. No. 3,890,407, the contents of which is incorporated herein by reference.

In another preferred embodiment of the present invention, the adhesive base formulation will comprise an organic sulfonyl chloride species having up to 20 carbon atoms, and/or a chlorosulfonated polymer. The organic sulfonyl chloride is advantageously present in an amount such that from about 3 to 160 mmoles of sulfonyl chloride groups are present per 100 grams of polymer.

One preferred embodiment of the present invention includes either a chlorinated or a chlorosulfonated polyethylene polymer resin. Preferably, however, the composition includes chlorosulfonated polyethylene polymer, the resin which, in turn, preferably contains from about 25 to about 70 weight percent chlorine and from about 3 to about 160 millimoles of sulfonyl chloride moiety per 100 grams of polymer. A most preferred chlorosulfonated polyethylene polymer resin employed in the composition of the present invention is marketed under the trademark "HYPALON 30" and is commercially available from E. I. Du Pont de Nemours & Company of Wilmington, Del.

Aspects and embodiments of the invention will be described with reference to the following examples. These examples are provided for purposes of illustration and are not intended to be construed as limiting the scope of the invention.

TABLE 1

| Materials | Adhesives | | | |
|---|---|---|---|---|
| | 1 (wt. %) | 2 (wt. %) | 3 (wt. %) | 4 (wt. %) |
| 25% Neoprene AD10 in MMA | 36.76 (10–50) | 26 (10–50) | 0 | 46 |
| 1% Napthaquinone in MMA | 1.2 (.1–2) | 0.8 (0.1–2) | 0 | 1.5 |
| 5% NaEDTA SOL. | 0.5 (.1–2) | 0.4 (0.1–2) | 0 | 1 |
| BTA 753 | 22 (5–30) | 23 (5–30) | 6.7 | 18.1 |
| Geloy 1020 | 0 | 0 | 5.1 | 0 |
| 40% Hypalon 30/MMA | 3.3 (2–10) | 3.3 (2–10) | 45.75 | 0 |
| 30% 1977 wax/MMA | 3.23 (1–5) | 3.23 (1–5) | 1.33 | 0 |
| BHT | 0.5 (.1–1) | 0.5 (0.1–1) | 1.13 | 0 |
| T-butylhydroperoxide | 0.58 (.1–2) | 0.58 (0.1–2) | 0 | 0 |
| Cumene Hydroperoxide | 0 | 0 | 1.13 | 0 |
| Dimetyl p Toluididne | 0 | 0 | 0 | .75 |
| 30%(40% Maleic Acid in Hypalon) in MMA | 7 (2–15) | 7 (2–15) | 33.3 | 0 |
| Methyl Methacrylate | 19.93 | 5.19 | 5.56 | 32.65 |
| Laurl Methacrylate | 0 | 25 (15–40) | 0 | 0 |
| Methacrylic Acid | 0 | 0 | 0 | 5 |
| CD550 | 5 (3–10) | 5 (3–10) | 0 | 0 |

Suitable range for the materials of Adhesives 1 and 2 are given in parenthesis

TABLE 2

| Materials | Activators | | |
|---|---|---|---|
| | 1 (wt. %) | 2 (wt. %) | 3 (wt. %) |
| 25% Neoprene AD10 in MMA | 41.06 (10–50) | 0 | 0 |
| 1% Napthaquinone in MMA | 1.34 (.1–2) | 0 | 0 |
| MMA | 31.78 | 74.4 | 0 |
| Paraloid BTA-753 | 21 (5–30) | 6.9 (5–30) | 17.2 (5–30) |
| KM 330 | 0 | 6.9 (5–30) | 0 |
| Geloy 1020 | 0 | 6.9 (5–30) | 0 |
| Doverphos S480 | 0.5 (.2–2) | 0 | 0 |
| Reillycat Asy-2 | 1 (0.5–3) | 3.7 (1–5) | 0 |
| 30% Parafin was in MMA | 3.3 (1–5) | 1.33 (1–5) | 0 |
| Copper Acetyl Acetonate | 0 | 0.00018 (0–0.001) | 0 |
| Kraton G1652 | 0 | 0 | 3.3 (0–10) |
| Diisodecyl Adipate | 0 | 0 | 18.1 (5–40) |
| Diglycidyl ether of bisphenol A | 0 | 0 | 21.4 (5–40) |
| Luperox ANS | 0 | 0 | 40 (10–50) |

Suitable range for the materials of the Activators are given in parenthesis
BHT is 2,6-Di-t-butyl-p-cresol
Paraloid BTA-753 is a methacrylate butadiene styrene impact modifier
Reillycat Asy-2 is 3,5-diethyl-J,2-dihydro-1-phenyl-2propyl pyridine
Lauryl Methacrylate is inhibited with 150 ppm of MEHQ
Doverphos S480 is phenyl,2,4-bis(1,1-dimethylethyl)-phosphite
Parafin was is Boler 1977 wax
CD550 is Methoxy polyethylene glycol (350) monomethacrylate from Sartomer Co.
Luperox ANS is a 55% benzoyl peroxide paste from Elf Atochem inc.
KratonG1652 is hydrogenated styrene-ethylene/butylene-styrene block copolymer from Shell Chemical Co.
Neoprene AD10 is polychloroprene from Dupont Procedure to Make Adhesive and Activator The following procedures were used to formulate the Adhesives and Activators in accordance with the invention.

Solutions

Several stock solutions were used in the formulas of the Adhesives and Activators.

The 25% Neoprene AD10 solution was made by rolling 750 parts of Neoprene AD10 and 2250 parts of methyl methacrylate in a glass jar for about 2 days until all the polymer was dissolved.

The 1% napthaquinone solution was made by mixing 1 parts of napthaquinone in 99 parts of methyl methacrylate until dissolved.

The 40% Hypalon 30 solution was made by rolling 1200 parts of Hypalon 30 in 1800 parts of methyl methacrylate in a glass jar for about 2 days until all of the polymer was dissolved.

The 30% (40% maleic acid in Hypalon 30) in methyl methacrylate was made by rolling 900 parts of maleic/Hypalon 30 pellets in 2100 parts of methyl methacrylate in a glass jar for about 2 days until it was uniform. The maleic/Hypalon pellets were made by milling the maleic acid in Hypalon.

The NaEDTA solution was made by mixing 5 parts of NaEDTA with 47.5 parts of water and 47.5 parts of isopropanol until uniform. The 30% parafin in methyl methacrylate was made by melting 180 parts of wax in a glass beaker and pouring it into 420 parts of methyl methacrylate while the monomer is being stirred. The stirring is continued until the slurry cools to room temperature.

Adhesive 1

The Neoprene solution was added to the Hypalon solution followed by the maleic acid solution, the napthaquinoine solution, the wax slurry, the BHT, the EDTA solution, the CD550 and methyl methacrylate. These were mixed in a plastic container with a high speed disperser until uniform. Mixing was continued while the Paraloid BTA 753 was added. After 5 minutes of mixing the adhesive was allowed to equilibrate overnight at room temperature. The next day the adhesive was mixed again until uniform. Finally, after cooling to about 80° F. the t-butyl hydroperoxide was added with mixing to make the adhesive uniform. The adhesive was degassed at a vacuum of 28–30 inches of mercury until the bubbles stopped coming out.

Activator 1

The activator was made by mixing the Neoprene solution, the napthaquinone solution, the S480, the wax slurry and the methyl methacrylate together until uniform. Mixing was continued while the Paraloid BTA 753 was added. After 5 minutes of mixing the adhesive was allowed to equilibrate overnight at room temperature. The next day the activator was mixed again until uniform. After cooling to about 80° F. the Reillycat Asy-2 was added and mixed in. The activator was degassed at a vacuum of 28–30 inches of mercury.

Adhesives 2 and 3 were made by the same method as Adhesive 1. Activator 2 was made by the same method as Activator 1.

Adhesive 4

While stirring on a high speed disperser the Neoprene solution, the napthaquinone solution, the methacrylic acid, the methyl methacrylate and the EDTA solution were mixed together. The dimethyl-p-toluidine was added and mixed in. Mixing was continued while the BTA 753 was added. After 5 additional minutes of mixing, the adhesive was allowed to equilabrate at room temperature overnight. The next day the adhesive was mixed again until uniform. The adhesive was degassed at a vacuum of 28–30 inches of mercury until the bubbles stopped forming.

Activator 3

The activator was made by dissolving Kraton G1652 into diisodecyl adipate while mixing on a high speed disperser.

The epoxy resin was added and mixed until uniform. While mixing, BTA 753 was added. After 5 additional minutes of mixing the activator was allowed to equilibrate at room temperature overnight. The next day the activator was mixed again until uniform. After cooling to below 80° F. the Luperox ANS is added while mixing. The activator was degassed at a vacuum of 28–30 inches of mercury until the bubbles stopped forming.

TABLE 3

| Example | 1 | 2 | 3 | 4 |
|---|---|---|---|---|
| Adhesive | 1 | 2 | 3 | 4 |
| Activator | 1 | 1 | 2 | 3 |
| Mix ratio by vol adhesive/activator | 1:1 | 1:1 | 1:1 | 10:1 |
| Cure time | 2 hr 44 min | 2 hr 30 min | 22 min | 9 min |
| Cure temperature | 246° F. | 236° F. | 245° F. | 220° F. |
| Boil at 1 inch thick | No | No | Yes | Yes |
| Elongation ASTM B-638 | 83% | 167% | 10% | 110% |
| Swim | yes | no | Yes | Yes |

Example 1 and 2 show that the adhesive in accordance with the invention does not boil even though the temperature is hot enough to boil methyl methacrylate. The adhesives in Examples 1 and 2 use the same type catalyst as the adhesive in Example 3 which does boil. The elongation in Examples 1 and 2 are much better than in Example 3.

Adhesives in accordance with embodiments of the invention can resist swim when applied to vertical thermoplastic and fiberglass reinforced polyester sheets. Thus, 1 inch thick beads applied to polyester substrates will not swim when the substrate is placed in the vertical position. Adhesion of panels in even the overhead position is possible.

Adhesives in accordance with embodiments of the invention do not boil when applied in 1 inch and greater beads. Adhesives in accordance with embodiments of the invention can have open times of 1 hour and cure times over 2 hours, as seen in Examples 1 and 2. The adhesives will also cure at relatively cool temperatures, such as 60° F. and below.

It will thus be seen that the objects set forth above, among those made apparent from the preceding description, are efficiently attained and, since certain changes may be made in the above-compositions of matter, methods and structures without departing from the spirit and scope of the invention, it is intended that all matter contained in the above-description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in a singular are intended to include compatible mixtuires of such ingredients wherever the sense permits.

What is claimed is:

1. A structural adhesive resulting from the combination of at least two parts: an adhesive part comprising at least one low molecular weight acrylic or methacrylic ester based monomer having 1–8 carbon atoms in the alcohol portion of the ester group, at least one acrylic or methacrylic ester based monomer having 9 to 40 carbon atoms in the alcohol portion of the ester group, at least one carboxylic acid component, and at least one sulfur bearing component; and an activator part; wherein the adhesive is formulated to have an open time during which the adhesive remains tacky but substantially uncured for over one hour and wherein the sulfur bearing component is selected from the group consisting of chlorosulfonated polyethylenes, sulfonyl chlorides and mixtures of sulfonyl chlorides with chlorinated polyethylenes.

2. The adhesive of claim 1, wherein the high molecular weight monomer component comprises lauryl methacrylate.

3. The adhesive of claim 1, wherein the high molecular weight monomer component comprises a polyethylene glycol methacrylate.

4. The adhesive of claim 1, wherein the high molecular weight monomer component comprises methoxy polyethlene glycol mono methacrylate.

5. The adhesive of claim 1, wherein the low molecular weight monomer component comprises methyl methacrylate.

6. The adhesive of claim 2, wherein the low molecular weight monomer component comprises methyl methacrylate.

7. The adhesive of claim 4, wherein the low molecular weight monomer component comprises methyl methacrylate.

8. The adhesive of claim 1, wherein the carboxylic acid component comprises maleic acid.

9. The adhesive of claim 1, wherein the sulfur bearing component added to the composition is mixed in at least one polymerizable vinyl monomer.

10. The adhesive of claim 9, wherein the sulfur bearing component added to the composition contains about 25 to 70 weight percent chlorine and about 3 to 160 mmoles of sulfonyl chloride moiety per 100 grams of polymer and the polyethylene from which the chlorosulfonated or chlorinated polyethylene is prepared has a melt index of from about 4 to 500.

11. The adhesive of claim 1, wherein the sulfur bearing component comprises a chlorosulfonated polyethylene resin.

12. The adhesive of claim 11, wherein the sulfur bearing component comprises a chlorosulfonated polyethylene resin and the resin comprises about 25 to about 70 weight percent chlorine and about 3 to about 160 millimoles of sulfonyl chloride moiety per 100 grams of polymer.

13. The adhesive of claim 1, wherein the composition is formed by including napthaquinone to the composition.

14. The adhesive of claim 1, wherein the composition is formed by including polychloroprene.

15. The adhesive of claim 1, wherein the composition is formed by including about 5 to 30% elastomer.

16. The adhesive of claim 1, wherein the composition is formed by including an impact modifier.

17. The adhesive of claim 1, wherein the composition is formed by including a graft copolymer.

18. The adhesive of claim 1, wherein the composition does not boil when deposited on a substrate to a thickness of up to at least one inch and permitted to cure.

19. The adhesive of claim 1, wherein the composition is formulated so that a one inch bead of the composition does not swim down a vertical polyester based substrate.

20. The adhesive of claim 1, wherein the composition is formulated so that the cured adhesive exhibits at least 50% elongation.

21. A structural adhesive comprising a composition prepared from at least two parts: an adhesive part including methacrylate or acrylate esters, a carboxylic acid component, and at least one sulfur bearing component; and an activator part; wherein a one inch thick bead of the adhesive has an open time of over one hour and will not exhibit substantial swim on a vertical polyester based substrate, the adhesive part comprises about 40 to 70 percent methacrylate ester monomer, no more than about 15% acid monomer, about 5 to 20 percent elastomer and about 10–30% graft copolymer, and the sulfur bearing component is a chlorosulfonated polyethylene resin comprising about 25 to about 70 weight percent chlorine and about 3 to about 160 millimoles of sulfonyl chloride moiety per 100 grams of polymer.

22. The adhesive of claim 2, wherein the adhesive will not boil when a 1 inch bead is applied to a substrate and permitted to cure.

23. The adhesive of claim 21, prepared from at least one high molecular weight methacrylic or acrylic monomer and at least one low molecular weight methacrylic or acrylic monomer.

24. The adhesive of claim 21, made from a high molecular weight methacrylic monomer and a low molecular weight methacrylic monomer.

25. The adhesive of claim 24, wherein the ratio of low molecular weight monomer to high molecular weight monomer is about 100:1 to about 100:40.

26. The adhesive of claim 24, wherein the low molecular weight monomer comprises methyl methacrylate.

27. The adhesive of claim 26, wherein the high molecular weight monomer comprises lauryl methacrylate.

28. The adhesive of claim 26, wherein the high molecular weight monomer comprises methoxy polyethylene glycol mono methacrylate.

29. The adhesive of claim 21, wherein the adhesive is made with a carboxylic acid comprising maleic acid.

30. A method of constructing boats, comprising providing a first panel; applying a bead of a structural adhesive formed by combining at least two parts: an adhesive part comprising at least one low molecular weight acrylic or methacrylic ester based monomer having 1–8 carbon atoms in the alcohol portion of the ester group, at least one acrylic or methacrylic ester based monomer having 9 to 40 carbon atoms in the alcohol portion of the ester group, at least one carboxylic acid component, and at least one sulfur bearing component; and an activator part; permitting over one hour to pass from the time the bead was first applied to pass; and adhering the panel to a second panel.

31. The method of claim 30, wherein the bead is over 20 feet long.

32. The method of claim 30, wherein the bead is at least 1 inch thick.

33. The method of claim 30, wherein the panel is a resin or thermoplastic based structure and the two panels are adhered in the vertical position.

* * * * *